Patented Jan. 24, 1928.

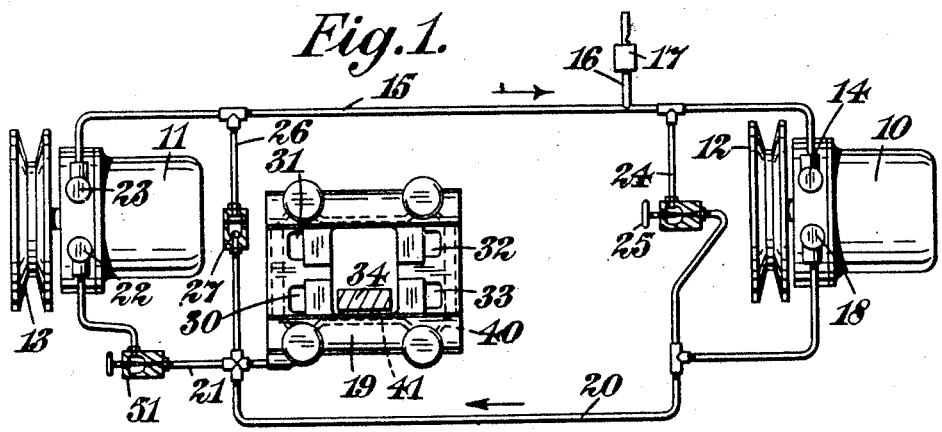

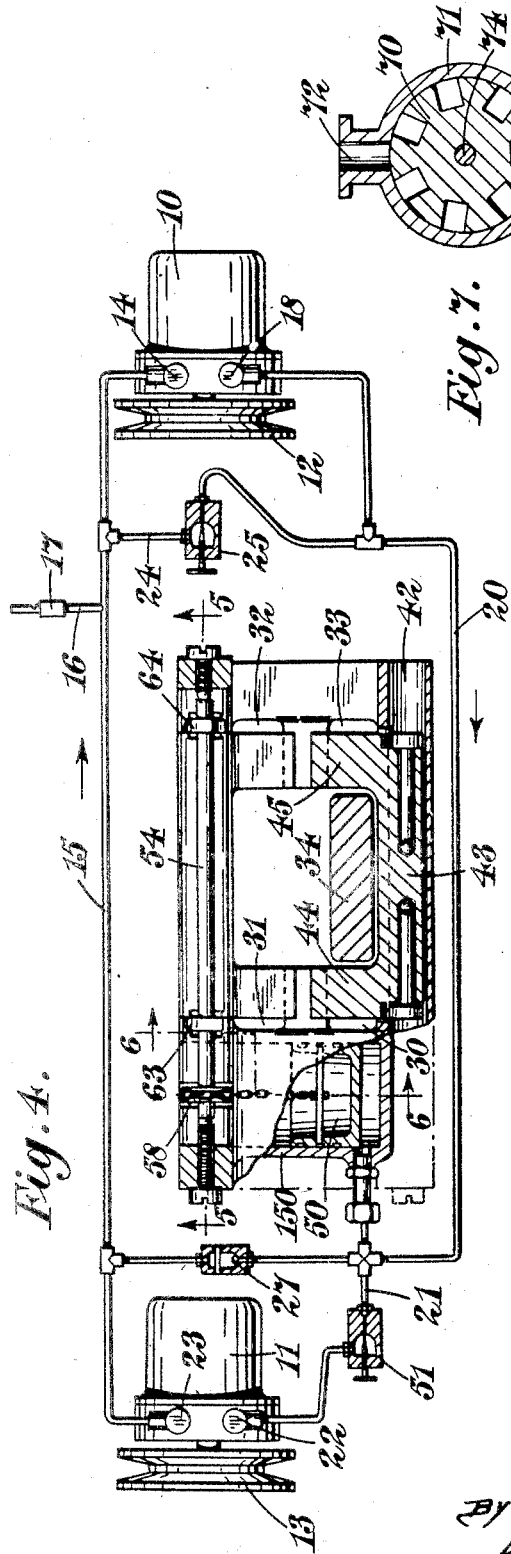
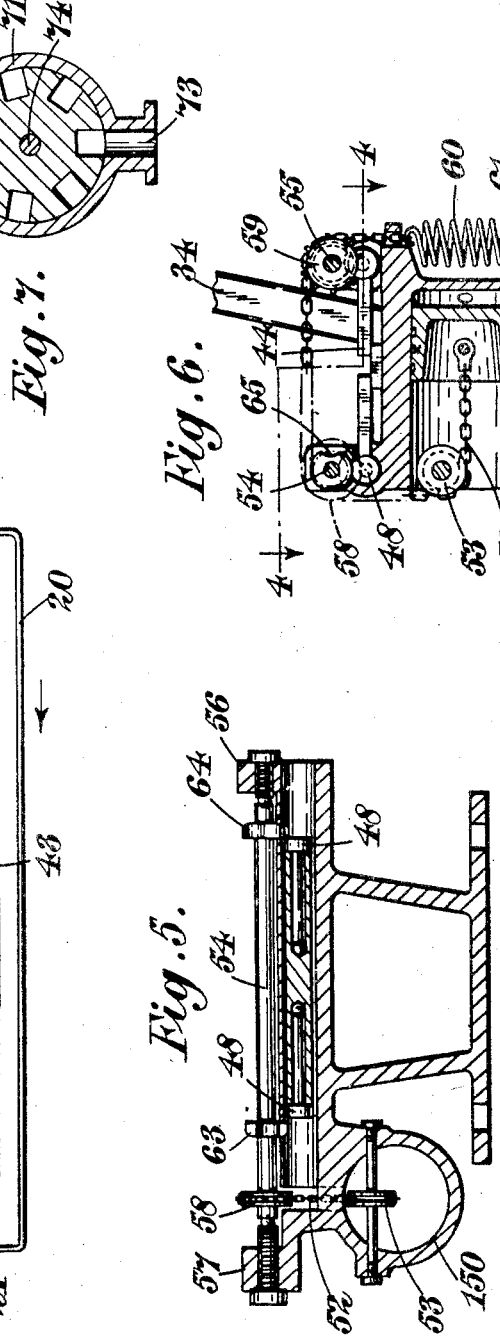
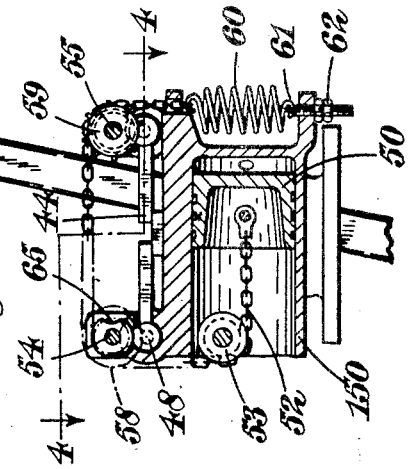
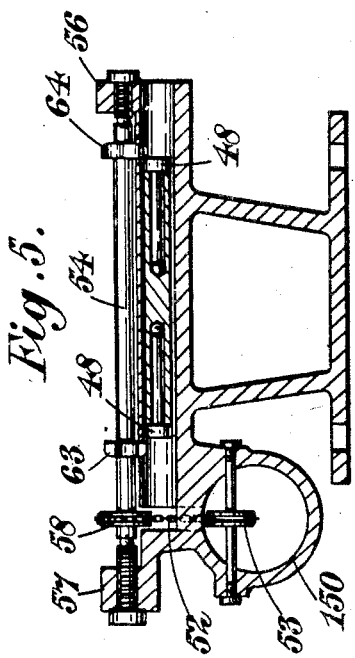

1,657,370

UNITED STATES PATENT OFFICE.

JOHN FREDERICK NEVINSON CRAIG, OF HERTFORDSHIRE, ENGLAND.

CHANGE-SPEED GEAR.

Application filed June 23, 1927, Serial No. 201,005, and in Great Britain January 11, 1926.

This invention comprises improvements in or relating to change speed gears. The invention has for an object to provide a control device for a gear-change operating-element of a change-speed gear so that the engagement of a pair of gears relating to a particular velocity ratio can only be effected when the peripheral velocities of the two gears are sufficiently alike to render such engagement simple and safe. Thus, for example, on motor vehicles the device will prevent gears being brought into contact with one another while running at speeds so different that the teeth are liable to be damaged or stripped, and the skill required of the driver in changing gear will be reduced. To this end the invention comprises a control device for a gear-change operating-element of a change-speed gear having in combination a pump and a metering device driven at speeds which correspond one with the speed of the driving and the other with the speed of the driven shaft of the gear and connected so that one delivers to the inlet of the other, a pressure-chamber interposed between the pump and the metering device, the arrangement being such that the resultant pressure in the chamber varies with the ratio of the respective speeds of the pump and metering device, and a pressure-responsive member actuated by the pressure in the pressure-chamber and operative connections between this and the gear-change operating element to release the latter for actuation, at a pressure at which the gears may safely be engaged with one another.

Preferably the pump and the metering device are pneumatic of a positive type, for example they may both be constituted by rotary plunger pumps one of which acts as a metering device.

It will be noted that the function of one of the pumps which has been described as a metering device is simply to allow the passage of a quantity of air from a higher to a lower pressure portion of the system, this quantity of air being dependent at any given pressure only upon the speed at which the metering pump is running. This function does not involve forcing the air against an opposing pressure but is merely a metering function and any suitable construction of device to fulfil this function may be adopted and is included herein under the term "metering device".

If desired, moreover, oil or other liquid may be used as a fluid pressure medium, the essential feature being that the system should have an elastic pressure characteristic, that is to say, the pressure should vary with the ratio of the respective speed of the pumps, either due to elasticity of the fluid, such as air or to the capacity of at least one of the pumps to give a pressure which varies with the speeds at a given delivery or with the delivery at a given speed. For example, a centrifugal pump has such a characteristic, or a plunger pump with resiliently mounted pistons and these could be used with an inelastic fluid such as oil.

A plurality of pressure-responsive members may be employed set to operate at different pressures which govern different movements of the gear-change operating-element or elements corresponding to various speed-ratios.

Alternatively a single pressure-responsive element may take up varying positions under different pressures and be operatively connected to means for controlling a plurality of movements of the gear-change lever.

The pressure-responsive member or members may consist of spring-controlled pistons one face of which is acted upon by the pressure in the pressure-chamber and which are operatively connected to a locking-abutment or abutments which stand in the path of the gear-change operating-element of the gear so that the pistons may release said abutments and free the operating-element when the pneumatic pressure reaches a predetermined value.

The locking-abutment may be mounted upon a sliding rod, the path of which intersects a bore in which the piston works, and the piston may carry a bolt (for example, may be formed as part of a plunger which constitutes a bolt) which is so cut away that at a certain position of the bolt in the bore it permits the rod to slide across the bore and thus release the abutment.

The bolt is preferably provided with longitudinal runways for balls which run on the inner surface of the bore and render its movement practically frictionless.

The end of the sliding-rod upon which the locking-abutment is mounted preferably carries a rotatable head for engaging the plunger and thus reducing friction between the rod and the plunger. By these various friction-reducing devices the sensitiveness of the mechanism is increased and the accuracy with which timing of the operation of changing gear is effected is enhanced.

The following is a description of one embodiment of the invention which is illustrated by way of example in the accompanying drawings in which:

Figure 1 is a diagrammatic representation of the general arrangement of a control device, Figure 2 is a vertical section of a plunger unit for controlling the releasing device on the gate of the change-speed gear, Figure 3, is a plan, partly in section, of the parts shown in Figure 2, Figure 4 is a view similar to Figure 1 of a modified construction, Figure 5 is a longitudinal vertical section of the same through the line 5, 5 of Figure 4, Figure 6 is a vertical cross-section of the same through the line 6, 6 of Figure 4, and Figure 7 is a detail.

Like reference characters denote like parts in all the figures.

Referring to Figure 1, 10 is a rotary metering pump of a positive type, i. e. one which delivers a definite volume of air at each revolution, such for example as a rotary plunger pump. 11 is an exhausting pump which may conveniently be of the same capacity and construction as the metering pump 10. The metering pump 10 is provided with a driving pulley 12 through which it receives motion from the secondary or tail-shaft of a change-speed gear such as that provided on a motor car. The exhausting pump 11 is provided with a similar pulley 13 to which motion is communicated from the primary shaft which drives the gear box. The inlet 14 of the pump 10 is connected to an inlet-pipe 15 having a branch 16 open to the atmosphere through a filter 17. The delivery 18 of the pump 10 is connected to a gate-control box 19 by a pipe 20 and the gate-control box 19 is connected by a pipe 21 to the inlet 22 of the pump 11. The outlet 23 of the pump 11 is connected to the pipe 15. The air has free passage through the gate-control box 19.

A branch pipe 24 connects the inlet and outlet of the metering pump 10 and in this branch pipe is a needle-valve 25 which may be adjusted to allow a very slight leak of air, the purpose of which will hereinafter appear.

A branch pipe 26 connects the inlet and outlet of the pump 11 and is provided with a non-return valve 27 which prevents excess of pressure in the pipe 21 over that in the pipe 15 but permits varying degrees of suction to exist in the pipes 20, 21, which thus constitute a pressure chamber connecting the pumps together.

The gate 19 comprises four notches 30, 31, 32, 33 of the usual pattern which serve to determine four positions into which the gear-change operating-element or lever 34 can be moved. The proportions and disposition of these notches are varied to suit the car for which the gear is designed. Adjacent to each notch is a vertical cylinder 35 and in the construction shown, which has four notches, there are four such cylinders. In each of the cylinders 35 is a plunger 36, the bottom end of which constitutes a piston and is provided with a suitable leather backing 37. The piston 36 is drawn upwardly in the cylinder by a spring 38 which is supported by an adjustable cap 39. The connection of the pipe 20 is to the underside of the plunger 36 and ports 40, 41 are provided which connect the bottom portion of all of the cylinders together so that the same pressure operates in each.

A horizontal bore 42 intersects the bores of two of the cylinders 35 on one side of the gate and a similar horizontal bore intersects the bores of the other two cylinders upon the other side of the gate. In each of the bores 42 there slides a rod 43 which carries two laterally projecting abutments 44, 45. The abutments project through a slot in the side of the bore 42 and are wide enough apart to embrace between them the change-speed operating-lever 34. The rod 43 is of such a length as to extend between two of the plungers 36 and when the plungers lie opposite the rod 43 it cannot be moved either forward or backward out of the central or neutral position. Each of the plungers 36 has a flat face 46 for engaging the corresponding end of the rod 43. In order to reduce the frictional drag of the rod upon the plunger, the rod 43 is bored centrally at each end to receive the stem 47 of a roller head 48. The edge of the roller head bears on the centre of the face 46. The back end of the stem 47 bears on a ball 49 in the bottom of the bore in the rod 43. Thus the roller 48 is rotated upon longitudinal movement of the plunger 36 and serves as an anti-friction bearing surface.

At one point in the length of the plunger 36 it is recessed or cut away, as shown at 50 so that when the recess 50 is brought into register with the bore 42, the rod 43 and with it the abutments 44, 45, are unlocked and made free to slide in the direction of the particular plunger which has unlocked them.

In operation the metering device 10 allows a quantity of air to pass into the pipe 20 at a rate which corresponds with the speed of revolution of the tail-shaft of the speed-gear. The pump 11 evactuates this air from the pipes 20, 21 and if the pump 11 and metering device 10 are rotated at the same speed as one another the air-pressure in the pipes 20, 21 will be atmospheric. If, however, the pump 11 is rotating more rapidly than the pump 10 the pressure in the pipes 20, 21, which are of small volumetric capacity, will almost instantly attain a subatmospheric pressure of definite value corresponding to the ratio between the speeds of the metering device and pump. Thus, as for every gear ratio of the change-speed gear there is a definite speed-ratio between the primary shaft and the tail-shaft speeds, there will be a corresponding definite pressure in the pipes 20, 21 when the primary-shaft and tail-shaft are running at the correct relative speeds. The plunger corresponding to the notch for any given speed is set to unlock the notch when this pressure is attained, and thus only when the primary shaft and tail-shaft are running at the correct relative speeds is the notch unlocked and the gear can be engaged.

In order to facilitate change of gear when the car is at rest, the leak 25 is provided which ensures that the pipe 20 will automatically return to atmospheric pressure when the pumps are stopped.

The non-return valve 27 ensures that no accidental excess of air shall accumulate in the pipes 20, 21 if the engine is stopped and the car "coasting" in neutral gear, so that the tail-shaft is rotating.

On the suction side of the pump inlet 22 there is provided an adjustable needle valve 51. The function of this valve is to set the device so that the pressure in the pressure-chamber may be adjusted until the abutments are unlocked at the exact speed desirable for change of gear.

Referring now to Figures 4–6, the general arrangement of the pipe-connections is the same as that shown in Figure 1 and is indicated by the same reference numerals. A different construction of gate-control box, however, is illustrated, having only one pressure-responsive element which controls all the gates. As before, the gate-control box comprises several gates 31, 32, 33 which are controlled by abutments 44, 45 mounted upon sliding rods 43 and the gear-change operating-lever 34 is only free to move into any gate when the gate-control abutment which crosses that gate is set free by the removal from the path of the sliding rod of a member actuated by a pressure-responsive element. The pressure-responsive element consists of a piston 50 working in a cylinder 150 located below the body of the gate-control box. The piston 50 is operatively connected by a chain 52 which passes over a pulley 53 to two control shafts 54, 55. The control-shafts 54, 55 are parallel with the axes of the sliding rods 43 and above them, being pivoted between gears 56, 57 on the control-box. The chain 52 is engaged with these shafts by sprockets 58, 59 to prevent slipping and the end of the chain is attached to a spring 60. The other end of the spring 60 is held by a screw 61 which is adjustable by nuts 62 in the frame of the control-box.

Each of the shafts 54, 55 carries two collars 63, 64 the diameter of which is sufficient to intersect the bore 42 in which the sliding rod 43 operates and the distance apart of the collars 63, 64 is equal to the length of the sliding rod so that the collars hold the rod from movement between them as shown in Figure 5. Each of the collars 63, 64 is notched, (as best seen in Figure 6) at one point 65 in its periphery so that when the control-shaft 54 or 55, as the case may be, is rotated to an appropriate point, the notch will coincide with the bore 42 and will free the sliding rod 43 for moving in a direction towards and past the particular collar 63 or 64, as the case may be, the notch 65 of which coincides with the bore.

The notches 65 are located at such relative points on the several collars that they free the sliding rods 43 from movement in succession, in accordance with various positions taken by the piston 50. Thus, in operation, assuming the mechanism is employed to control the gear box of an automobile, when the car is at rest with the engine running, a particular degree of pressure will be created in the cylinder 150 which will cause the piston 50 to take up a position which may be the inmost position, as shown in the drawing. The collars 63 are so notched that under these conditions the lever 34 is free to move forwardly into the position to engage the first gear. When it is desired to change gear to a higher speed, the gear must first be disengaged and thereupon when the relative speeds of the driving and driven shafts of the gear have been brought to a correct ratio for engaging the second gear, the piston 50 will have taken up a definite second position and another of the collars 63, 64 is so notched that in this position the gear-change-operating-lever can be advanced freely into the corresponding gate of the control-box to mesh the gears. For the top speed, again a different gate is set free.

It has been pointed out hereinabove that one of the pumps 10, 11 acts as a pump while the other merely acts as a metering-device, i. e. a device which allows a certain quantity of air to pass proportional to its speed. While one of the devices 10, 11 must therefore be a full pump with valves, the other may if desired, although not necessarily, be constituted by a simpler mechanism such for example as a chambered disc rotating in a closely fitting casing, as illustrated in Figure 7. In Figure 7, the chambered disc is indicated by the numeral 70 and the casing therefor by the numeral 71, an inlet being shown at 72 and an outlet at 73. The disc 70 is mounted upon an operating shaft 74 which is driven by a pulley 12 or 13, as the case may be, from the driving or driven shaft of the gear. In this case it is preferable to arrange the pump to be actuated from the driven shaft of the gear and the metering device, shown in Figure 7 to be actuated from the driving shaft. Assuming the gear to be mounted upon an automobile, when the car is at rest the pump element will not be working, and as the metering device will not of itself produce any passage of air the pressure in the system will be atmospheric. This pressure is arranged to free the first gear and the reverse gear for actuattion and, if desired, it can also be arranged to free the other gears so that the car can be started upon any gear. As soon as the car is set in motion, the pump will start working and a definite vacuum will be created in the chamber connected to the pressure-responsive element so that the gears are no longer free to be engaged, except when the driving and driven shafts are running at a particular and correct relative speed.

I claim:—

1. A control-device for a gear-change operating-element of a change-speed gear, having in combination a pump and a metering-device driven at speeds which correspond one with the speed of the driving shaft and the other with the speed of the driven shaft of the gear and connected so that one delivers to the inlet of the other, a pressure-chamber interposed between the pump and metering-device, the arrangement being such that the resultant pressure in the chamber varies with the ratio of the respective speeds of the pump and metering-device, a pressure-responsive element actuated by the pressure in the pressure-chamber and operative connections between this and the gear-change operating-element to release the latter for actuation, at a pressure at which the gears may safely be engaged with one another.

2. A control-device for a gear-change operating-element of a change-speed gear, as claimed in claim 1 wherein the pump is of a positive type.

3. A control-device for a gear-change operating-element of a change-speed gear, as claimed in claim 1 wherein the pressure-responsive element comprises a spring-controlled piston and operative connections between the said piston and a locking abutment which stands in the path of the gear-change operating-element of the gear for the purpose described.

4. A control-device for a gear-change operating-element of a change-speed gear as claimed in claim 1 wherein the pressure-responsive element is operatively connected to a notched body which is movable transversely to the line of movement of the gear-change operating-element so that said notch may be aligned at a suitable pressure to release the gear-change operating-element for actuation.

5. A control device for a gear-change operating-element of a change-speed gear, having in combination, a pair of rotary fluid transmitting devices, one of which is a pump, said devices being driven at speeds which correspond, one with the speed of the driving shaft and the other at the speed of the driven shaft of the gear and connected so that one delivers to the inlet of the other, a pressure chamber interposed therebetween, the arrangement being such that the resultant pressure in the chamber varies with the ratio of the respective speeds of the two rotary fluid transmitting devices, a pressure-responsive element actuated by the pressure in the pressure chamber and operative connections between this and the gear-change operating-element to release the latter for actuation, at a pressure at which the gears may be safely engaged with one another.

6. A control-device for a gear-change operating-element of a change-speed gear, as claimed in claim 5 wherein the pressure-responsive element comprises a spring-controlled piston and operative connections between the said piston and a locking abutment which stands in the path of the gear-change operating-element of the gear for the purpose described.

7. A control-device for a gear-change operating-element of a change-speed gear as claimed in claim 5 wherein the pressure-responsive element is operatively connected to a notched body which is movable transversely to the line of movement of the gear-change operating-element so that said notch may be aligned at a suitable pressure to release the gear-change operating-element for actuation.

8. A control-device for a gear-change operating-element of a change-speed gear as claimed in claim 1 wherein the metering-device comprises a chambered-disc working in a close-fitting casing provided with inlet and outlet ports substantially as and for the purpose set forth.

In testimony whereof I affix my signature.

JOHN FREDERICK NEVINSON CRAIG.